United States Patent
Normann et al.

(10) Patent No.: US 6,446,502 B1
(45) Date of Patent: Sep. 10, 2002

(54) METHOD FOR ASSIGNING IDENTIFIERS, PRESENT IN SIGNALS EMITTED BY TRANSMITTERS IN A TIRE PRESSURE MONITORING SYSTEM, TO THE WHEELS WHERE THE TRANSMITTERS ARE LOCATED

(75) Inventors: Norbert Normann, Niefern-Öschelbronn (DE); Roland Michal, Lustenau (AT)

(73) Assignee: Beru Aktiengesellschaft, Ludwigsburg (DE)

(*) Notice: Subject to any disclaimer, the term of this patent is extended or adjusted under 35 U.S.C. 154(b) by 0 days.

(21) Appl. No.: 09/486,257

(22) PCT Filed: Jul. 30, 1998

(86) PCT No.: PCT/EP98/04761
§ 371 (c)(1),
(2), (4) Date: Feb. 22, 2000

(87) PCT Pub. No.: WO99/08887
PCT Pub. Date: Feb. 25, 1999

(30) Foreign Application Priority Data

Aug. 19, 1997 (DE) .......................... 197 35 686

(51) Int. Cl.$^7$ .................... B60C 23/02; B60C 23/00
(52) U.S. Cl. ..................................... 73/146.5
(58) Field of Search .............. 73/146.5, 146.2, 73/146.3, 146.4, 146.8; 340/444, 442, 447, 669, 446, 445

(56) References Cited

U.S. PATENT DOCUMENTS 5,483,827 A * 1/1996 Kulka et al. ............... 73/146.5
5,646,845 A * 7/1997 Gudat et al. .......... 364/424.051

FOREIGN PATENT DOCUMENTS

DE   2905931     8/1980
DE   19608478    5/1997
EP   0760299     3/1997

* cited by examiner

Primary Examiner—Benjamin R. Fuller
Assistant Examiner—Abdullahi Aw-Musse
(74) Attorney, Agent, or Firm—Horst M. Kasper

(57) ABSTRACT

The invention relates to a method for assigning identifiers, contained in signals emitted by transmitters in a tire pressure control system, to the position of the wheels where the transmitters are located. Said system comprises a pressure sensor, a transmitter and a transmit antenna on each of a plurality of wheels of a vehicle, one or more receive antennas on the vehicle body, and receiving and evaluating units connected to this body via cables. In this method, the signals containing the identifier are intercepted by the receive antenna(s) and transmitted to the receiving and evaluating units, where they are evaluated in accordance with their identifiers. The invention is characterized in that, for the monitored wheels, not just the air pressure in the tires, but also the acceleration obtained from the movement of the wheel is measured. A signal derived therefrom is transmitted via the relevant transmitter in the receiving or evaluating circuit, and evaluated for the information contained in the signal regarding the position of the wheel which emitted the signal.

6 Claims, 1 Drawing Sheet

METHOD FOR ASSIGNING IDENTIFIERS, PRESENT IN SIGNALS EMITTED BY TRANSMITTERS IN A TIRE PRESSURE MONITORING SYSTEM, TO THE WHEELS WHERE THE TRANSMITTERS ARE LOCATED

CROSS-REFERENCES TO RELATED APPLICATIONS (not applicable)

STATEMENT REGARDING FEDERALLY SPONSORED RESEARCH OR DEVELOPMENT (not applicable)

REFERENCE TO A "MICROFICHE APPENDIX" (SEE 37 CFR 1.96)

(not applicable)

BACKGROUND OF THE INVENTION

1. Field of the Invention

The Invention begins with the method according to the features given in the preamble of claim 1. Such a method is known from the German printed patent document DE-196084 78 A1. The known tire pressure monitoring system provides a pressure sensor at each wheel of a vehicle, an electronic evaluation circuit connected to the pressure sensor, a transmitter, a transmitter antenna and a battery wherein the battery supplies current to an electronic circuit (designated in the following as wheel electronics) furnished at the wheel. Receiver antennas are furnished at the body of the vehicle neighboring to the wheels, wherein the receiver antennas are connected to a central receiver and evaluation circuit (designated in the following as central evaluation electronics) through cables.

2. Description of the Related Art Including Information Disclosed Under 37 CFR 1.97 and 1.98

The unequivocal coordination of the transmitter to the position of its wheel at the vehicle is a problem posed in connection with such tire pressure monitoring systems. The transmitters generate for this purpose a signal subdivided in four sections, comprising a preamble, an identifier, a measurement signal and a postamble. The central evaluation electronics can recognize by way of the identifier (identification signal), where the emitting wheel is disposed at the vehicle. However it is a precondition for this that the identification signal and the wheel positions have been previously unequivocally coordinated and that this coordination was stored in the central evaluation electronics. The German printed patent document DE 19608478 A1 teaches a possibility, how this coordination can be automatically determined from the signals emitted from the wheel electronics after the first time mounting of wheels at a vehicle or after a wheel change. For this purpose a statistic evaluation of the signal intensities is performed: in fact each receiver antenna receives signals from all transmitting wheels of the vehicle, however one starts with the assumption that the signals from the wheel disposed closest to the respective receiver antenna are received with the largest intensity on a statistical average.

A similar coordination method is known from the German printed patent document DE 19608479 A1.

The conventional coordination methods are associated with the disadvantage that they cause substantial costs of the tire pressure monitoring system, because a separate receiver antenna is furnished for each wheel, which receiver antenna is to be connected to the central receiving and evaluation circuit in the vehicle with an antenna cable.

It is an object of the present invention to furnish a possibility to accomplish the automaic coordination of the identification signals emitted by the wheel electronics to certain wheel positions with low expenditures.

BRIEF SUMMARY OF THE INVENTION

BRIEF DESCRIPTION OF THE DRAWING

In the accompanying drawing, in which is shown one of the various possible embodiments of the present invention.

Figure 1:
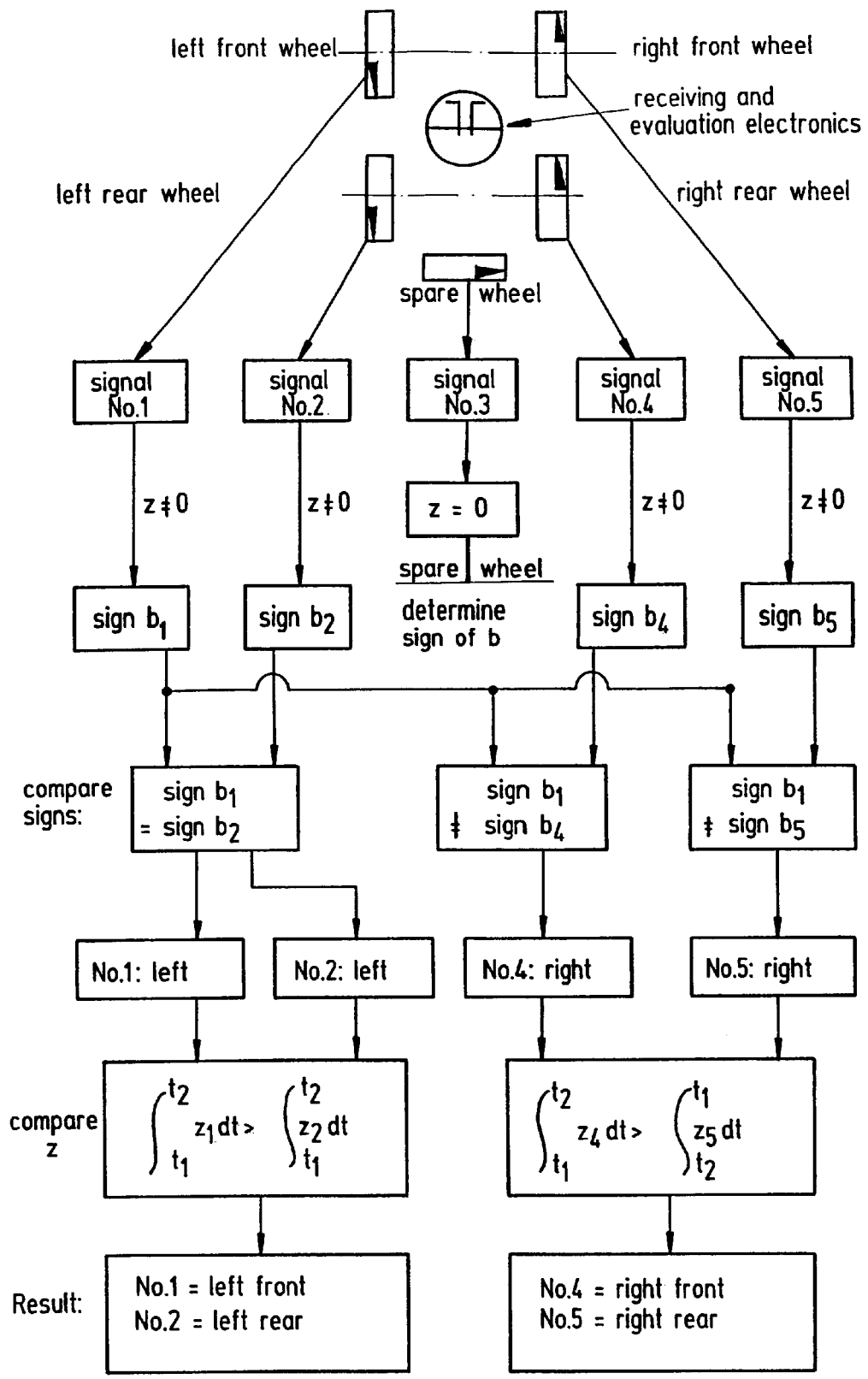
FIG. 1 is a view of a schematic diagram of the control procedure.

This object is achieved by a method with the features recited in claim 1. Advantageous further embodiments of the invention are subject matter of the depending claims.

The solution according to the present invention provides to supplement the wheel electronics present at the respective wheel in such a way, that the wheel electronics do not only measure the tire pressure and transmit the tire pressure to the central receiving and evaluation circuit, but additionally transmit information relating to the state of motion of the respective wheel, wherein information about the position of the respective wheel at the vehicle is obtained from the state of motion of the wheel. The acceleration signals delivered by an acceleration sensor connected to the wheel electronics are either evaluated in the wheel electronics and the result of the evaluation is emitted to the central evaluation electronics, or the acceleration signals are inserted into the regularly emitted signal by the wheel electronics, the signal is emitted to the central evaluation electronics and is evaluated in the central evaluation electronics.

Miniaturized acceleration sensor based on semiconductors are available, wherein the acceleration sensors can be integrated into the wheel electronics required anyway with relatively small expenditures. The therewith associated additional expenditure in the wheel electronics is substantially small as compared with the expenditure, which is avoided based on the elimination of receiver antennas and their cable connections.

DETAILED DESCRIPTION OF THE INVENTION

Information relating to the wheel position can be derived from acceleration signals, which are obtained at the wheel, in the following ways:

1. A centrifugal acceleration occurs at the wheel by rotating of the wheel. No centrifugal acceleration occurs only at carried spare wheel while the vehicle is rolling. Signals, which are received while the vehicle is rolling, but which signalize a centrifugal acceleration z=0, are therefore associated with a spare wheel carried along.

2. The strength of the centrifugal acceleration occurring at the wheel depends on the rotation speed of the wheel. If the strength of the centrifugal acceleration is integrated over a predetermined period of time in the central receiving and evaluation circuit, then the size of the integral value is a measure for the path, which was covered by the wheel in that time period. Since the steered front wheels cover a larger path during riding a curve as compared to the non-steered rear wheels of the vehicle, the integral value for a steered front wheel will be larger than the integral value for the non-steered rear wheel. The identifiers, which are contained in the signals, which lead to the largest integral values, therefore, can be associated with the steered front wheels of the vehicle.

3. In case of a corresponding mounting position of the acceleration sensor at the wheel, an acceleration sensor at a wheel on the right hand side of the vehicle and an acceleration sensor at a wheel on the left hand side of the vehicle deliver track acceleration signals with opposite signs in case of an acceleration of the vehicle. The acceleration component occurring in circumferential direction of the wheel during acceleration (or breaking) is designated here as track acceleration. The sign of the track acceleration signal allows a distinction between right and left wheels, wherein the sign is preferably already determined in the wheel electronics and transmitted to the central receiving and evaluation circuit. Most preferably the distinction between right and left wheels is performed in the acceleration phase after a start of the vehicle.

If the identification signal of the spare wheel has been determined from the centrifugal acceleration, and after determination from the track acceleration, which of the wheels are disposed on the right hand side and which of the wheels are disposed on the left hand side of the vehicle, then the residual distinction between the front wheels and the rear wheels can also be determined by a reduced number of antennas on the receiver side relative to the state-of-the-art set of an evaluation of integral values of the centrifugal acceleration, namely by coordinating to each axle of the vehicle only one associated receiver antenna. The distinction between the individual axles can be performed by a statistical evaluation of the signal intensities in the same manner as is taught in the German printed patent documents DE 19608478 A1 or in DE 19608479 A1, wherein however not any longer an associated receiver antenna is required at the vehicle for each wheel, but only a common receiver antenna for wheels disposed on a common axle.

4. In addition, the occurrence of a Coriolis acceleration at the steered wheel can be observed and evaluated for distinguishing of steered front wheels and not steered rear wheels of the vehicle according to a further embodiment of the present Invention. A Coriolis acceleration does not occur at the non-steered wheels, however occurs at the steered wheels when steering motions are performed. When a wheel signalizes the occurrence of a Coriolis acceleration then it is obvious, that the wheel is one of the steered front wheels.

The centrifugal acceleration acts perpendicular to the track acceleration. The Coriolis acceleration in turn acts perpendicular to the centrifugal acceleration and to the track acceleration.

An acceleration sensor capable of distinguishing between accelerations in the direction of three different coordinate axes or an arrangement of three acceleration sensors, which are sensitive in three different coordinate axes, are suitable and advantageous for the present invention. The present invention cannot only be performed with a three axes acceleration sensor, but as previously illustrated, also with the aid of a two axes acceleration sensor, however even with an acceleration sensor sensitive only in a single axis direction, for example with the aid of a sensor capturing the centrifugal acceleration, which sensor permits to determine the spare wheel and to distinguish between the steered front wheels and the non-steered rear wheels, such that only one receiver antenna is required on each axle at the vehicle floor side for distinguishing between right wheels and left wheels.

What is claimed is:

1. Method for the coordination of identification signals, which are contained in signals which are emitted by transmitters in a tire pressure monitoring system, comprising the steps of;

furnishing a tire pressure monitoring system including in each case a pressure sensor, a transmitter and a transmitter antenna at each one of a plurality of wheels of a vehicle, of one or several receiver antennas at the body of the vehicle and of a receiving and evaluation electronics connected through cables to the receiver antennas, to the positions of the wheels, at which wheels of the transmitters are disposed, capturing signals, which contain an identification signal, by one or several receiver antennas, transferring the signals to the receiver and evaluation electronics, and evaluating the signals relative to the identification signal in the receiving and evaluation electronics, measuring an acceleration resulting from the state of motion of the respective wheel at the monitored wheels in addition to the air pressure in the tire, signalizing a signal derived therefrom by way of the respective transmitter to the receiving and evaluation circuit, and evaluating an information contained in the track acceleration signal about the position of that wheel, from which wheel the track acceleration signal derives, and determining the sign of the track acceleration (b) occurring at the wheel already in an evaluation circuit disposed at the wheel during an acceleration phase after the start of the vehicle for distinguishing of wheels on the right hand side of the vehicle from wheels on the left hand side of the vehicle.

2. Method according to claim 1 further comprising the steps of;

measuring and signalizing in addition the centrifugal acceleration (z) to the receiving and evaluation electronics and receiving a centrifugal acceleration signal in case of a rolling vehicle, which signal signalizes a centrifugal acceleration z=0, is coordinated to a carried on spare wheel.

3. Method according to claim 1 further comprising the steps of;

measuring in addition the centrifugal acceleration (z) and signalized to the receiving and evaluation electronics and integrating centrifugal acceleration signals delivering the strength of the measured centrifugal acceleration over a predetermined time period for distinguishing of steered wheels and non-steered wheels of the vehicle, wherein those centrifugal acceleration signals are associated to the steered wheels, which centrifugal acceleration signals deliver the largest integral values.

4. Method according to claim 1 further comprising the steps of;

determining and signalizing the occurrence of a Coriolis acceleration for distinguishing of steered wheels and non-steered wheels of the vehicle during steering motions.

5. Method according to claim 1 further comprising the steps of;

coordinating in each case a common receiver antenna to wheels disposed on a common axle of the vehicle.

6. Method according to claim 1 further comprising the steps of;

employing only a single antenna for the totality of the emitting wheels of the vehicle.

* * * * *